United States Patent Office 3,433,629
Patented Mar. 18, 1969

3,433,629
PROCESS OF RECOVERING MANGANESE FROM MANGANESE ORES
Kazutami Imai and Tatsuo Tano, Okayama-shi, and Hiroo Noro, Akashi-shi, Japan, assignors to Tomoji Murata, Akashi-shi, Japan
No Drawing. Filed Sept. 9, 1965, Ser. No. 486,230
Claims priority, application Japan, Jan. 30, 1965, 40/5,234; Mar. 31, 1965, 40/10,060; May 7, 1965, 40/26,759
U.S. Cl. 75—101                      6 Claims
Int. Cl. C01g 1/10; C12d 1/00, 3/00

ABSTRACT OF THE DISCLOSURE

A microbiological process for dissolving and recovering manganese in the form of water soluble salts from manganese ores, characterized by converting manganese in manganese ores in powder form into water soluble manganese sulfate by the action of *Thiobacillus thiooxidans*, a member of the Thiobacillus genus, which has been cultured in a suitable culture medium containing sulfur under shaking or aeration, the action taking place during continued culturing either with added manganese ores crushed into powders with hydrogen sulfide or sulfur dioxide gas introduced into the culture medium, or with an added mixture of the manganese ore powder and a metal sulfide.

---

This invention relates to a process of recovering manganese from manganese ores by leaching the element in the form of an aqueous manganese sulfate solution, in which *Thiobacillus thiooxidans*, a member of the Thiobacillus genus, is cultivated in a sulfur containing culture solution of an appropriate composition and then crushed ores containing manganese, together with a metal sulfide, are added to the solution, or an appropriate amount of gaseous hydrogen sulfide is introduced into the mixture of the culture solution and the manganese ores both being mentioned above, or a necessary amount of sulfur dioxide, either alone or as a component of a gaseous mixture, is introduced into a suspension of crushed manganese ores in water or into water containing a suitable surface active agent and to the resulting mixture is added the above described culture solution or to a fresh aqeous solution of sulfur dioxide is added under stirring crushed manganese ores with subsequent adjustment of the pH and the culture solution is added to it, then any of the foregoing mixtures is shaken or stirred by aeration for a suitable period at a suitable temperature to convert the manganese into a water soluble form.

Use of members of the Thiobacillus genus, such as *Thiobacillus thiooxidans*, *Thiobacillus ferrooxidans* and *Thiobacillus thioparus*, in recovering metals from ores is known, in that the process has been described prior to the present invention in Japanese Patent Gazettes Sho 37-7302, Sho 37-15208, as well as in U.S. Patent No. 2,829,964 specification and a report entitled, "Microbiological Process in Mining" (The Mining Journal, Apr. 10, 1959, p. 694).

The cited U.S. Patent No. 2,829,964 specification describes that, in the process of leaching metals (mainly copper and iron) from metallurgical materials with the leaching agent containing ferric sulfate and sulfuric acid, the bacteria tentatively named *Thiobacillus ferrooxidans* found in the exhaust solution from a certain mine in the United States of America is used for the purpose to oxidize ferrous sulfate formed during the leaching and regenerate the leaching agent. The United States patent specification further describes that the strong resistance of the bacteria against relatively high concentration of sulfuric acid and ions such as copper, aluminum, magnesium, manganese, etc. makes it possible to apply the bacteria to the purpose.

The above cited literature "The Mining Journal," summarizing reports of various studies in foreign countries concerning the application of bacteria to minerals, describes that the bacteria belonging to the Thiobacillus genus, such as *Thiobacillus thiooxidans*, can be applied directly to minerals to convert insoluble metallic salts into soluble forms and extract the latter, that bacteria acclimatized to metal ions can effectively be applied to sulfide ores, that in case of oxide ores sulfur must necessarily be added to stimulate the bacterial growth, and finally that manganese was extracted with high yields from four types of manganese ores of low quality.

Reports are found somewhere in other literatures not cited above concerning the behavior of microorganisms of the Thiobacillus genus against metallic salts, and they describe a relatively long period necessary for the bacteria to dissolve metals in soluble salt forms.

The present inventors have investigated isolated *Thiobacillus thiooxidans* and its behavior to metallic compounds.

In the Experiment 1 carried out with *Thiobacillus thiooxidans* thoroughly acclimatized to metallic ions, it has been concluded that sulfide of copper or zinc does not allow the bacteria to grow in the culture medium with no sulfur addition, and that even in the medium with sulfur addition, the increase in number of bacteria is smaller, while the amount of formed sulfuric acid is slightly larger, when the sulfides are not present.

EXPERIMENT 1

| | Parts |
|---|---|
| Potassium dihydrogen phosphate | 0.4 |
| Magnesium sulfate ($MgSO_4$) | 0.03 |
| Calcium sulfate ($CaSO_4$) | 0.025 |
| Ferrous sulfate ($FeSO_4$) | 0.001 |
| Ammonium sulfate (($NH_4$)$_2SO_4$) | 0.2 |
| Water ($H_2O$) | 100.0 |

*Thiobacillus thiooxidans* was cultivated in the culture solution of the composition shown above with addition of one part of sulfur at 30° C. and for 7 days under continuous shaking, after which period the mixture was filtered (with No. 2 of Toyo Filter Paper) to remove sulfur and then the pH of the filtrate was adjusted to 1.0 with sterile sodium carbonate.

Eighty milliliters of the culture solution of the same composition was placed in a shaking flask along with sulfur and copper sulfide in the amounts shown in Table 1 and sterilized as usual with steam. Twenty milliliters of the above culture solution containing the bacteria was added and cultivated under shaking at 30° C. and for 7 days. The variation of the amount of bacteria and sulfuric acid was measured as shown in Table 2.

TABLE 1

| Running No. | Addition | |
|---|---|---|
| | Sulfur (g./100 ml.) | Copper sulfide (g./100 ml.) |
| 1 | 0 | 0 |
| 2 | 0.5 | 0 |
| 3 | 0 | 0.2 |
| 4 | 0.5 | 0.2 |

TABLE 2

| Running No. | pH Original | pH In 7 days | Bacteria (mg./100 ml.) Original | Bacteria (mg./100 ml.) In 7 days | Sulfuric acid (g./100 ml.) Original | Sulfuric acid (g./100 ml.) In 7 days | Increase |
|---|---|---|---|---|---|---|---|
| 1 | 1.0 | 1.0 | 3.1 | 2.7 | 0.760 | 0.867 | 0.107 |
| 2 | 1.0 | 0.8 | 2.9 | 23.5 | 0.956 | 1.472 | 0.549 |
| 3 | 1.0 | 1.1 | 3.5 | 0.5 | 1.002 | 0.904 | −0.096 |
| 4 | 1.0 | 0.9 | 3.3 | 14.2 | 0.877 | 1.501 | 0.624 |

In this country the reserves of rich manganese ores have gradually decreased in recent years, so that manganese dioxide for batteries, for example, is prepared electrolytically from manganese sulfate which is obtained by sulfuric acid treatment of manganese carbonate ores. Nevertheless poor ores in which the content of manganese is below a certain level are usually discarded without any treatment from economical consideration.

As for low grade manganese dioxide and metallic manganese ores, in particular, it is impossible to commercially utilize them as manganese dioxide by electrolysing manganese sulfate, because their solubility in sulfuric acid is small.

The present inventors have been engaged, as well as in the bacteriological investigation of *Thiobacillus thiooxidans*, in the application of the microorganism to metallic compounds, especially for the purpose to recover by leaching manganese as manganese sulfate from different manganese ores. We found that the bacteria can hardly grow with not only pure manganese dioxide but also some of manganese dioxide ores depending on their origins. This result was obtained from the experiments with bacteria thoroughly acclimatized to manganese ions. To eliminate the drawback of the process and improve it up to industrial utility, various additives to the leaching system were repeatedly investigated. The result is that the addition of metal sulfides such as sulfides of zinc, copper, iron, etc. made the bacterial growth more active as well as the leached amount of manganese remarkably increased.

EXPERIMENT 2

| | Parts |
|---|---|
| Potassium dihydrogen phosphate | 0.4 |
| Magnesium sulfate ($MgSO_4$) | 0.03 |
| Calcium chloride ($CaCl_2$) | 0.025 |
| Ferrous sulfate ($FeSO_4$) | 0.001 |
| Ammonium sulfate (($NH_4$)$_2SO_4$) | 0.2 |
| Sulfur (S) | 1.0 |
| Water ($H_2O$) | 100.0 |

*Thiobacillus thiooxidans* was cultivated in the basic culture solution of the above shown composition for 80 hours under shaking at 30° C. until the content of sulfuric acid reached 1.5–1.7 g./100 ml. Then to 100 ml. of the solution were added manganese dioxide (guaranteed reagent) and metal sulfides as shown in Table 3, and the mixture was kept at 30° C. The amount of leached manganese was measured as shown in Table 3.

It is apparent from Experiment 1 that copper sulfide even in the presence of sulfur did not stimulate the growth of *Thiobacillus thiooxidans* any more than sulfur alone did. On the contrary, copper sulfide made the bacteria considerably active in the presence of manganese dioxide, giving about four-fold as much dissolving power for manganese as compared with the case where the sulfide was not added, as is seen in Table 3.

Zinc sulfide, in particular, increased the amount of extracted manganese up to nearly twenty times as compared with the case where zinc sulfide was not added.

Although the mechanism by which the above process takes place is still to be investigated, the present invention, making use of microorganisms in the presence of metal sulfides, is characterized by the remarkable increase of bacterial activity to extract manganese from manganese dioxide which hitherto was known to be hardly attacked by bacteria, and by remarkably enshortened time required for dissolving manganese salts from manganese ores. Thus the process of the present invention has a great industrial utility for such purposes.

EXPERIMENT 3

It is clearly understood that the bacteria in the culture medium help sulfur to form sulfuric acid, while they contribute to produce sulfates in the presence of metal sulfides in the present invention. Therefore, in case iron sulfide is used as metal sulfide ferric sulfate and sulfuric acid should be produced, which are supposed to exhibit the same dissolving effect on manganese dioxide as the ferric sulfate-sulfuric acid leaching agent described in the specification of U.S. Patent No. 2,829,964. In this respect the effects of iron sulfide, sulfuric acid and *Thiobacillus thiooxidans* on dissolving manganese from pure manganese dioxide were investigated using the basic culture medium as described in the Experiment 2, so as to investigate difference in the amount of manganese leached from manganese oxide. The results are shown in Table 4. As can be seen in the table, when iron sulfide is present along with manganese dioxide, the addition of the bacteria made the amount of dissolved manganese to considerably increase with time, while the addition of sulfuric acid in place of the bacteria gave slight increase to the dissolved amount. Conclusively, the influence of the bacteria in the presence of iron sulfide was much greater than that of the ferric sulfate-sulfuric acid leaching agent, therefore this invention is obviously based on entirely different functions from the above U.S. patent. Furthermore, since manganese dioxide is of oxidizing nature, the ferric salt in the dissolving agent can never be reduced to the ferrous state, the latter having lower dissolving power. The culture medium used was of the same composition as was described in Experiment 2.

TABLE 3

| Running No | $MnO_2$ | Additives to the culture medium (mg./100 ml.) FeS | Additives to the culture medium (mg./100 ml.) CuS | Additives to the culture medium (mg./100 ml.) ZnS | $H_2SO_4$ (g./100 ml.) | Original, $H_2SO_4$ (g./100 ml.) | In 72 hours, Mn, p.p.m. |
|---|---|---|---|---|---|---|---|
| 1 | 500 | 0 | 0 | 0 | 1.5 | 1.8 | 94 |
| 2 | 500 | 132 | 0 | 0 | 1.6 | 2.3 | 1,110 |
| 3 | 500 | 0 | 143 | 0 | 1.7 | 2.0 | 428 |
| 4 | 500 | 0 | 0 | 146 | 1.5 | 2.0 | 1,850 |

TABLE 4

| No. | Added to the medium (mg./100 ml.) $MnO_2$ | Added to the medium (mg./100 ml.) FeS | Added to the medium (mg./100 ml.) $H_2SO_4$ | Added to the medium (mg./100 ml.) Bacteria | In zero hour, $H_2SO_4$ (mg./100 ml.) | In 72 hours $H_2SO_4$ (mg./100 ml.) | In 72 hours Mn (p.p.m.) | In 120 hours $H_2SO_4$ (mg./100 ml.) | In 120 hours Mn (p.p.m.) | In 164 hours $H_2SO_4$ (mg./100 ml.) | In 164 hours Mn (p.p.m.) |
|---|---|---|---|---|---|---|---|---|---|---|---|
| 1 | 500 | 0 | 0 | Added | 1.9 | 1.9 | 94 | 1.8 | 12.2 | 3.5 | 1,640 |
| 2 | 500 | 100 | 0 | do | 1.5 | 2.2 | 420 | 2.5 | 710 | | |
| 3 | 500 | 0 | 3,000 | None | 3.0 | | 52 | 3.0 | 84 | 3.1 | 560 |
| 4 | 500 | 100 | 3,000 | do | 3.0 | | 380 | | 500 | | |
| | 500 | 100 | 0 | do | | | 0 | | 0 | | |

The Experiments 1-3 revealed that manganese dioxide in the pure state was almost not dissolved in dilute sulfuric acid, that Thiobacillus thiooxidans, even in the presence of sulfur, so slightly attacked manganese dioxide as not to be utilized commercially, and that metal sulfides, such as zinc sulfide, which did not remarkably contribute, even in the presence of sulfur, either to the growth of Thiobacillus thiooxidans or to the increase in the amount of formed sulfuric acid, exhibited a remarkable effect to make the bacterial activity much more active as well as to considerably increase the amount of dissolved manganese.

Further investigation revealed that, whenever in the course of cultivating Thiobacillus thiooxidans in the medium containing crushed manganese ores and sulfur, the pH of the reaction system became nearly 1.0 and hence the increase of bacteria became sluggish, additions of hydrogen sulfide in adequate amounts markedly increased the bacterial growth and the rate of dissolution of manganese independently of manganese are species.

In the following experiment pure manganese dioxide (guaranteed reagent) was used because manganese dioxide ores had been found to be most inhibitory in the microbiological dissolution heretofore described.

EXPERIMENT 4

Thiobacillus thiooxidans was cultivated in the culture solution of the same composition as employed in Experiment 2 for 80 hours under shaking at 30° C., after which time the content of sulfuric acid was about 1.5 g./100 ml. and then 25 g. of manganese dioxide was added.

Comparative experiments were carried out with the culture medium as follows:

(1) Stirring with aeration was continued at 30° C. The percentage of manganese dissolved into the medium remained at 0.015% after 72 and also 120 hours.

(2) Stirring with aeration was continued throughout the treatment. Immediately after the addition of manganese dioxide hydrogen sulfide was introduced into the medium for 30 minutes at the rate of 30 ml./min. after which time the percentage of manganese dissolved amounted to 43%, then after following 50 hours culture bubbling of hydrogen sulfide took place for 20 minutes at the same rate after which 75% of manganese was measured to have been dissolved, and the final percentage of dissolution after additional 30 hours culture reached 94%.

It was concluded from the results that the addition of hydrogen sulfide at any adequate time not only makes easy the dissolution of manganese from dioxide in the form of a water soluble salt in the culture medium containing Thiobacillus thiooxidans, which otherwise is reluctant to dissolve manganese, but also favors the growth of bacteria, thus increasing the rate of formation of sulfuric acid. These combined effects permit almost all of manganese dioxide to be dissolved in the form of a water soluble salt within a relatively short period.

In further experiments where the content of sulfur was increased in the culture medium, elongated time of culture and increased frequency of hydrogen sulfide addition converted the major part of sulfur into sulfuric acid and consequently dissolved manganese as a water soluble salt in high concentrations from manganese dioxide and the dissolved amount of which corresponded to the sulfuric acid formed. These effects may be ascribed to the strong tolerance of Thiobacillus thiooxidans against manganese sulfate, to the stimulated formation of sulfuric acid at the pH favored to the bacterial growth which is attained even in dilute sulfuric acid solutions when added hydrogen sulfide makes manganese dioxide combine with the almost total amount of sulfuric acid present, and also to some effect of hydrogen sulfide in the medium onto the reaction system to promote the bacterial growth as well as the formation of sulfuric acid from sulfur even in the presence of manganese dioxide.

Therefore, this invention relates to the microbiological process to dissolve manganese in water soluble salts from manganese ores. The characterized process takes place in either of the following ways:

(1) Thiobacillus thiooxidans inoculated in a suitable medium containing sulfur is cultivated at 30° C. under continuous shaking or aeration. At the time the pH of the medium reaches closely 0.7-1.0 which is infavorable to the bacterial growth, are added crushed managanese ores and hydrogen sulfide, for example, by bubbling, the former containing such an amount of components reacting with sulfuric acid as corresponds to that of bacteriogenic sulfuric acid formed from sulfur, to dissolve the major part of manganese dioxide which is otherwise insoluble in dilute sulfuric acid in the form of water soluble salts. Then the pH of the reaction system is increased to favor the bacterial growth. In the course of the continued culture adequate amounts of ore powders and hydrogen sulfide are added repeatedly whenever the pH is decreased; or (2) Manganese ores in powder is added to the original cultur medium in the amount as to contain components which is equivalent to lesser amount of sulfuric acid than the expected amount of the acid bacteriogenic from sulfur. During the course of culture when the pH is decreased to about 1.0 hydrogen sulfide is added to dissolve manganese. The addition of hydrogen sulfide is repeated at the decreased pH.

Furthermore in the survey of effects of additives on the reaction process, it was found that, without employing the above bacteria, sulfur dioxide (sulfurous acid gas) introduced into stirred water readily converted manganese dioxide into water soluble salts and the reaction proceeded almost quantitatively in short time.

The main reaction product was manganese dithionate as the literatures say already. We found that when the solution was treated with the bacteria Thiobacillus thiooxidans, the manganese dithionate was converted quantitatively into manganese sulphate. Manganese dithionate is relatively stable for oxidation, and it is not oxidized by mild oxidizing treatments as the aeration.

For example, 100 ml. of water and 5 g. of manganese dioxide were placed in a 300 ml. flask (A), the stopper being provided with an inlet tube for sulfur dioxide extending close to the bottom and an outlet tube. The outlet tube was connected to the inlet tube of a stoppered 100 ml. flask (B) extending to the bottom and the outlet tube from the flask (B) was connected to the inlet tube of the stoppered flask (C) extending to the bottom. The flask (C) contained 100 ml. of 0.1 N solution of sodium hydroxide and the outlet tube was provided at the stopper. Sulfur dioxide was introduced into the flask (A) under shaking. The gas was absorbed with evolved heat while the particles of manganese dioxide were dissolved to form a transparent solution. The introduction of the gas was stopped when the bubbling appeared in the flask (B), then the acid content of the solution in each flask was determined as $SO_2$, and the residual solid in the flask (A) as unreacted matter. The result was: 3.3% of unreacted matter; 0.65, 0.07 and 0% of acid content in flask (A), (B) and (C) respectively; about 102 ml. of solution resulting in the flask (A) excluding the solid matter. Manganese dioxide up to 96.7% was converted into water soluble salts using almost no excess of sulfur dioxide. The similar experiment conducted with manganese carbonate showed 98% of dissolution. The salts consisted of dithionate in the major part and sulfate in the remainder, in other words about 80% of manganese dithionate and 20% of manganese sulfate. When Thiobacillus thiooxidans was added into the solution adjusted to pH 3-4 and cultured for a day at 30±5° C. under either shaking or aeration, a larger part of manganese dithionate was very readily converted into sulfate.

EXPERIMENT 5

Thiobacillus thiooxidans was cultivated at 30° C. in the medium of the same composition as described in Experiment 2 for 3 days under shaking then separated from solid matters. 30 ml. of the above described solution containing dithionate and sulfate (approximately pH 2.6) was adjusted with sodium carbonate to pH 3.5 and diluted to 80 ml. with water, then 20 ml. of the bacterial solution was added and cultivated at 30° C. for 20 hours under aerated stirring, the resulting solution being named, (A) 30 ml. of the above solution containing dithionate and sulfate was diluted with water to 100 ml. and stirred with aeration for 20 hours at 30° C., (B) 30 ml. of the same solution was diluted with water to 100 ml., (C) the amounts of precipitate of barium salt formed with an added barium chloride solution are shown in Table 5.

TABLE 5

| Solution | (A) | (B) | (C) |
|---|---|---|---|
| Original solution taken (ml.) | 30 | 30 | 30 |
| Barium salt precipitated (mg.) | 5,240 | 2,100 | 1,970 |

Estimation with use of the amounts of formed barium salt showed that about 95% of manganese dithionate was converted by *Thiobacillus thiooxidans* into manganese sulfate and sulfuric acid.

This invention relates to a process to dissolve manganese in the form of water soluble salts from low quality manganese ores containing manganese dioxide as the major component and to provide therefrom stable sulfate of high industrial utility.

When the sulfur dioxide employed in this invention is pure or of high concentration, contact of the gas with the mixture of ores and water and solubility thereof into water are good enough to permit the gas to react without loss with manganese salts in the ore powders. On the contrary when a mixed gas, for example an exhaust gas at a chemical factory, which contains relatively low concentration of sulfur dioxide is used as source, other components such as air, for example, in the mixed gas prevent sulfur dioxide from fully contacting with the ores, hence low degree of reaction of sulfur dioxide with manganese salts in the ore powders. If, however, adequate surface active agents which are resistant to acids, stable to metal ions and do not inhibit the growth of the bacteria, *Thiobacillus thiooxidans*, for example nonionic surface active agents such as polyoxyethylene nonylphenol ether and polyoxyethylene sorbitan monoleate are added to the mixture of water and the ore powders, the sulfur dioxide in low concentration forms tiny bubbles when introduced in the water, more tiny than they are in the absence of the surface active agent, leading to improved rate of reaction with a dissolution of manganese salts in the ores.

This invention will be explained in detail in the following examples.

EXAMPLE 1

|  | Parts |
|---|---|
| Potassium dihydrogen phosphate | 0.4 |
| Magnesium sulfate ($MgSO_4$) | 0.03 |
| Calcium chloride ($CaCl_2$) | 0.025 |
| Ferrous sulfate ($FeSO_4$) | 0.001 |
| Ammonium sulfate (($NH_4$)$_2SO_4$) | 0.2 |
| Sulfur (S) | 1.0 |
| Water ($H_2O$) | 100.0 |

*Thiobacillus thiooxidans* inoculated to the culture medium of the above compositions was cultivated at 30° C. under shaking for 80 hours. To each 100 ml. of the resulting solution were added each 100 mg. of three different ores, A, B and C, in powder and such amount of metal sulfide in powder as corresponds to about 20% in weight to manganese contained in each ore (shown below), and then the mixtures were kept at 30° C. under aeration. A certain volume of the cultivated solution taken at certain intervals of time was analysed to determine manganese dissolved and therefrom the percentage dissolution of manganese in the original ores was calculated, the result being shown in Table 6.

TABLE 6

| Mn ore | Content of Mn in the ore (percent) | Additives to 100 ml. of the culture medium (mg.) | | | Mn dissolved (percent) in— | | |
|---|---|---|---|---|---|---|---|
| | | Mn ore | ZnS | FeS | 48 hr. | 72 hr. | 160 hr. |
| A | 55.8 | 1,000 | 0 | 0 | 0.8 | 2.5 | 3.2 |
|  |  | 1,000 | 100 | 0 | 24.7 | 78.7 | 98.1 |
|  |  | 1,000 | 0 | 100 | 16.8 | 49.4 | 97.9 |
| B | 26.6 | 1,000 | 0 | 0 | 7.1 | 21.1 | 25.5 |
|  |  | 1,000 | 55 | 0 | 29.5 | 79.0 | 98.7 |
|  |  | 1,000 | 0 | 55 | 19.3 | 53.0 | 98.5 |
| C | 33.2 | 1,000 | 0 | 0 | 18.0 | 57.9 | 71.3 |
|  |  | 1,000 | 65 | 0 | 27.6 | 77.8 | 99.3 |
|  |  | 1,000 | 0 | 65 | 24.4 | 69.3 | 99.5 |

EXAMPLE 2

|  | Parts |
|---|---|
| Potassium dihydrogen phosphate | 0.4 |
| Magnesium sulfate ($MgSO_4$) | 0.03 |
| Calcium chloride ($CaCl_2$) | 0.025 |
| Ferrous sulfate ($FeSO_4$) | 0.001 |
| Ammonium sulfate (($NH_4$)$_2SO_4$) | 0.2 |
| Sulfur (S) | 2.0 |
| Water ($H_2O$) | 100.0 |

*Thiobacillus thiooxidans* was inoculated to the culture solution consisting of the above indicated components and cultured at 30° C. under shaking for 80 hours. To 100 ml. of the culture medium was added 15 g. of manganese dioxide ore in powder form containing 15% $MnO_2$, 8% $CaO$ and 67% $SiO_2$. While the mixture was stirred with aeration at 30° C., hydrogen sufide was introduced for 30 minutes at the rate of 30 ml./min., resulting in the increased pH. The culture was contained wherein introduction of hydrogen sulfide was repeated two more times in the same way at every 25 hours culturing. The 99% of manganese dioxide was dissolved, hence the content of manganese sulfate reached up to 25%.

EXAMPLE 3

One hundred ml. of the culture medium containing the bacteria as described in Example 2 was kept at 30° C. under stirring with aeration for a period of 80 hours after which time the content of sulfuric acid became 1.3 g./100 ml. 4 g. of manganese ore in powder form containing 26% $MnO_2$ and 3% FeS was added. While the mixture was continuously stirred with aeration, hydrogen sulfiide was introduced at the rate of 30 ml./min. for 20 minutes, then the culture was continued for 20 hours hours under aeration. Addition of 4 g. ore powders followed by the introduction of hydrogen sulfide was repeated three more times to obtain 98% dissolution of manganese dioxide.

EXAMPLE 4

Fifty g. of crushed manganese dioxide ore (content of $MnO_2$ 22%) and 200 ml. of water were placed in a reaction cell. While the mixture was stirred, sulfur dioxide gas (100% concentrated) was introduced for 20 minutes from the bottom of the cell at the rate of 300 ml./min. to react with the ore. 205 ml. of the solution separated by centrifugation from insoluble matters was analysed for manganese. The observed dissolution of manganese amounted to 98%.

Subsequently, the last solution was submitted to the following treatment.

|                                              | Parts  |
|----------------------------------------------|--------|
| Potassium dihydrogen phosphate               | 0.4    |
| Magnesium sulfate (MgSO$_4$)                 | 0.03   |
| Calcium chloride (CaCl$_2$)                  | 0.025  |
| Ferrous sulfate (FeSO$_4$)                   | 0.001  |
| Ammonium sulfate ((NH$_4$)$_2$SO$_4$)        | 0.2    |
| Sulfur (S)                                   | 1.0    |
| Water (H$_2$O)                               | 100.0  |

*Thiobacillus thiooxidans* was inoculated to the culture medium of the above composition and cultured at 30° C. under shaking for 3 days, then separated from solid matters. On the other hand, 100 ml. of the solution containing manganese as appeared in the preceding paragraph was partly neutralized with a sodium carbonate solution to pH 4.0 and diluted with water to the volume of 200 ml., to which 70 ml. of the above bacterial solution was added and cultured at 30° C. under aeration for 20 hours. The resulting solution was analysed for sulfate with a barium chloride solution. The result showed that 97% of the manganese dissolved by the reaction with sulfur dioxide converted into the form of sulfate.

EXAMPLE 5

Into 450 ml. of water was slowly introduced 50 g. of sulfur dioxide gas (100% concentrated) to be dissolved. Immediately after dissolution 50 g. of crushed manganese dioxide ore (content of MnO$_2$ 65%) below 50 mesh was added in small portions in about 30 minutes to react. Ninety-four percent of the manganese dioxide was found to have been dissolved in the solution separated from solid matters. To 30 ml. of the final solution was brought to pH 3.8 with a sodium carbonate solution and made to a total volume of 70 ml. To this 30 ml. of the bacterial solution, the same one as was used in Example 4, was inoculated and cultivated at 30° C. under shaking for 70 hours. Analysis demonstrated that 99% of manganese in the solution existed in the form of sulfate.

EXAMPLE 6

In a cylindrical vessel of a 6 cm. diameter was placed a mixture of 10 g. of manganese dioxide ore, containing 17% MnO$_2$ and 11% CaO, crushed to below 50 mesh and 250 ml. of an aqueous solution containing 0.25 g. of polyethylene nonylphenol ether. An air containing 1 g. sulfur dioxide per 35 l. air was introduced from the bottom through an annular tube provided with a number of holes for 40 minutes at the rate of 3 l./min. The exhaust gas from the top of the vessel was analysed for SO$_2$ content and the solution separated by centrifugation from solid matters for Mn content, giving the SO$_2$ content of 590 p.p.m. in the exhaust gas and dissolution of 89.9% manganese dioxide to the total into the solution. As much as 94% of sulfur dioxide in the mixed gas was removed by the reaction. To the whole final solution, without being neutralized because the pH was 3.4, 30 ml. of the same bacterial solution as described in Example 4 was added. After being aerated at 30° C. for 30 hours, the resulting solution showed that 87.2% of the manganese dioxide dissolved existed in the form of sulfate.

What is claimed is:

1. A microbiological process for dissolving and recovering manganese in the form of water soluble salts from manganese dioxide ore, which comprises adding the powdered manganese dioxide ore together with a metal sulfide into a culture liquid at about 30° C. in which *Thiobacillus thiooxidans*, a member of the Thiobacillus genus has been cultivated, said culture liquid comprising potassium dihydrogen phosphate, magnesium sulfate, calcium sulfate, ferrous sulfate, ammonium sulfate, sulfur and water.

2. The process according to claim 1 in which the powdered manganese dioxide ore, per se, is added to the culture liquid and then a gas containing hydrogen sulfide is introduced into the culture liquid while continuing the cultivation.

3. The process according to claim 1 in which the powdered manganese dioxide ore, per se, is premixed with water and a gas containing sulfure dioxide is introduced to the mixture to convert the manganese dioxide into a water soluble salt, and then the culture liquid is added to the solution and the cultivation is continued.

4. The process according to claim 2, comprising repeated addition of manganese dioxide ore in powder form along with introduction of hydrogen sulfide gas into the culture liquid when the pH of the liquid reaches about 1.0, while *Thiobacillus thiooxidans*, a member of the Thiobacillus genus, is being cultivated.

5. The process according to claim 2, comprising first adding the manganese dioxide ore in powder form to the culture liquid in which the named bacteria is being cultivated followed by repeated addition of hydrogen sulfide gas when the pH of the liquid is decreased to about 1.0.

6. The process according to claim 3 where the culture liquid is added to the solution at a pH value between 3 and 4.

References Cited

UNITED STATES PATENTS

| 3,266,889 | 8/1966 | Duncan et al. | 75—121 |
| 2,829,964 | 4/1958 | Zimmerley et al. | 75—101 |

OTHER REFERENCES

The Mining Journing, Apil 10, 1959, p. 694.

L. DEWAYNE RUTLEDGE, *Primary Examiner.*

TERRY R. FRYE, *Assistant Examiner.*

U.S. Cl. X.R.

75—115, 121; 23—58